Patented Sept. 15, 1953

2,652,396

UNITED STATES PATENT OFFICE 2,652,396

BIS-CYANINE DYES AND METHOD OF PREPARATION

Grafton H. Keyes and Leslie G. S. Brooker, Rochester, N. Y., assignors to Eastman Kodak Company, Rochester, N. Y., a corporation of New Jersey No Drawing. Application March 6, 1951, Serial No. 214,194

10 Claims. (Cl. 260—240.1)

This invention relates to new bis-cyanine dyes and a method for preparing them.

Cyanine dyes containing more than two heterocyclic nuclei have been known for some time. Recently, cyanine dyes have been described which contain, in effect, two cyanine dye units joined together through heterocyclic nitrogen atoms. See, for example, Wilson U. S. Patent 2,425,773, issued August 19, 1947, and Brooker U. S. Patent 2,461,137, issued February 8, 1949.

We have now found a new type of cyanine dye, members of which can be called bis-cyanine dyes. Our new dyes contain two cyanine units which are joined together through a methylene group, the linkage being a carbon to carbon bridge. Many of the dyes of our invention are excellent sensitizers for photographic silver halide emulsions.

It is, therefore, an object of our invention to provide new bis-cyanine dyes and methods for making them. Another object is to provide photographic silver halide emulsion sensitized with our new dyes. A further object is to provide a new heterocyclic base and a method for making it. Other objects will become apparent from a consideration of the following description and examples.

The bis-cyanine dyes of our invention can be represented by the following general formula:

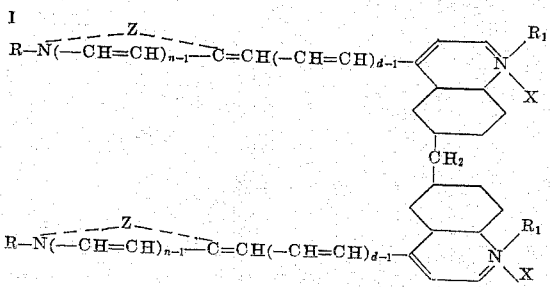

wherein $n$ and $d$ each represents a positive integer from 1 to 2, R and $R_1$ each represents an alkyl group (i. e. an alcohol radical), e. g. methyl, ethyl, n-propyl, isobutyl, n-butyl, n-amyl, isoamyl (e. g. an alkyl group of the formula $C_mH_{2m+1}$ wherein $m$ represents a positive integer from 1 to 5), β-hydroxyethyl, γ-hydroxypropyl, β-methoxyethyl, β-ethoxyethyl, allyl, β-methallyl, benzyl (phenylmethyl), β-phenylethyl, β-carboxyethyl, carboxymethyl, α-carboxyethyl, γ-carboxypropyl, β-acetoxyethyl, γ-acetoxypropyl, carbomethoxymethyl, β-carbomethoxyethyl, carbethoxymethyl, β-carbethoxyethyl, β-sulfoethyl, phenylmercaptomethyl, phenoxymethyl, β-phenylmercaptoethyl, β-phenoxyethyl, etc., X represents an acid anion, e. g. chloride, bromide, iodide, thiocyanate, sulfamate, methylsulfate, ethylsulfate, perchlorate, benzenesulfonate, p-toluenesulfonate, xylenesulfonate, etc. and Z represents the non-metallic atoms necessary to complete a heterocyclic nucleus selected from the group consisting of those of the thiazole series (e. g. thiazole, 4-methylthiazole, 5-methylthiazole, 4-phenylthiazole, 5-phenylthiazole, 4,5-dimethylthiazole, 4,5-diphenylthiazole, 4-(2-thineyl) thiazole, etc.), those of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e. g. α-naphthothiazole, β-naphthothiazole, 5-methoxy-β-naphthothiazole, 5-ethoxy-β-naphthothiazole, 7-methoxy-α-naphthothiazole, 8-methoxy-α-naphthothiazole, etc.), those of the thionaphtheno-7′,6′,4,5-thiazole series (e. g. 4′-methoxythionaphtheno-7′,6′,-4,5-thiazole, etc.), those of the oxazole series (e. g. 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e. g. benzoxazole, 5-chlorobenzoxazole, 5-phenylbenzoxazole, 5-methylbenzoxazole, 6-methylbenzoxazole, 5,6-dimethylzenoxazole, 4,6-dimethylbenzoxazole, 5-methoxybenzoxazole, 6-methoxybenzoxazole, 5-ethoxybenzoxazole, 6-chlorobenzoxazole, 5-hydroxybenzoxazole, 6-hydroxybenzoxazole, etc.), those of the naphthoxazole series (e. g. α-naphthoxazole, β-naphthoxazole, etc.), those of the selenazole series (e. g. 4-methylselenazole, 4-phenylselenazole, etc.), those of the benzoselenazole series (e. g. benzoselenazole, 5-chlorobenzoselenazole, 5-methoxybenzoselenazole, 5-hydroxybenzoselenazole, tetrahydrobenzoselenazole, etc.), those of the naphthoselenazole series (e. g. α-naphthoselenazole, β-naphthoselenazole, etc.), those of the thiazoline series (e. g. thiazoline, 4-methylthiazoline, etc.), those of the 2-quinoline series (e. g. quinoline, 3-methylquinoline, 5-methylquinoline, 7- methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e. g. quinoline, 6-methoxyquinoline, 7-methylquinoline, 8-methylquinoline, etc.) those of the 1-isoquinoline series (e. g. isoquinoline, 3,4-dihydroisoquinoline, etc.), those of the 3-isoquinoline series (e. g. isoquinoline, etc.), those of the 3,3- dialkylindolenine series (e. g. 3,3-dimethylindolenine, 3,3,5-trimethylindolenine, 3,3,7-trimethylindolenine, etc.), those of the 2-pyridine series (e. g. pyridine, 3-methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4,6-dimethylpyridine, 4-chloropyridine, 5-chloropyridine, 6-chloropyridine, 3-hydroxypyridine, 4-hydroxypyridine, 5-hydroxypyridine, 6-hydroxypyridine, 3-phenylpyridine, 4-phenylpyridine, 6-phenylpyridine, etc.), those of the 4-pyridine series (e. g. 2-methylpyridine, 3-methylpyridine, 2-chloropyridine, 3-chloropyridine, 2,3-dimethylpyridine, 2,5-dimethylpyridine, 2,6-dimethylpyridine, 2 - hydroxypyridine, 3 - hydroxypyridine, etc.), etc.

The new bis-cyanine dyes of our invention wherein $d$ in Formula I represents 1 can advantageously be prepared by condensing a cyclammonium quaternary salt selected from those represented by the following general formula:

II

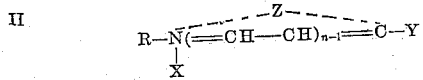

wherein $R$, $X$, $Z$ and $n$ have the values set forth above and $Y$ represents an electronegative group, such as chlorine, bromine, iodine, an alkoxyl group (e. g. methoxyl, ethoxyl, etc.), and a —S—$R_2$ group, wherein $R_2$ represents an alkyl group (e. g. methyl, ethyl, benzyl (phenylmethyl), etc.) or an aryl group, such as phenyl, p-chlorophenyl, p-tolyl, etc., with a bis-lepidine compound selected from those represented by the following general formula:

III

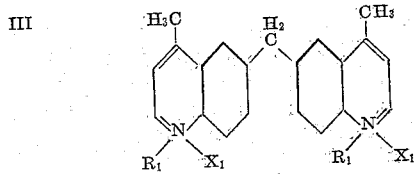

wherein $R_1$ has the values set forth above and $X_1$ represents an acid radical, such as those set forth above for $X$.

The condensations can be accelerated by heating and the use of a basic condensing agent. Typical basic condensing agents comprise the liquid trialkylamines (e. g. triethylamine, tri-n-propylamine, triisopropylamine, tri-n-butylamine, tri-n-amylamine, etc.), the N,N-dialkylanilines (e. g. N,N-dimethylaniline, N,N-diethylaniline, etc.), the heterocyclic tertiary amines (e. g. pyridine, quinoline, etc.), etc.

The condensations can be carried out in the presence of an inert solvent, if desired. Typical solvents include the aliphatic alcohols, e. g. ethanol, n-propanol, isopropanol, n-butanol, etc., diethyl ether, 1,4-dioxane, etc.

The new bis-cyanine dyes of our invention wherein $d$ in Formula I represents 2, can advantageously be prepared by condensing a cyclammonium quaternary salt selected from those represented by the following general formula:

IV

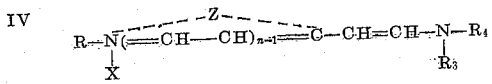

wherein $R$, $X$, $Z$, and $n$ have the values set forth above, $R_3$ represents an acyl group (e. g. acetyl, propionyl, benzoyl, etc.) or a hydrogen atom, and $R_4$ represents an alkyl group (e. g. methyl, ethyl, etc.) or an aryl group (e. g. phenyl, o-, m-, or p-tolyl, etc.), with a bis-lepidine compound selected from those represented by Formula III above.

The condensations can be accelerated by heating and the use of a basic condensing agent. Typical basic condensing agents include the liquid trialkylamines (e. g. triethylamine, tri-n-propylamine, triisopropylamine, tri-n-butylamine, etc.), the N,N-dialkylanilines (e. g. N,N-dimethylaniline, N,N-diethylaniline, etc.), the N-alkylpiperidines (e. g. N-methylpiperidine, N-ethylpiperidine, etc.), the heterocyclic tertiary amines (e. g. pyridine, quinoline, etc.), etc.

The condensations can be carried out in the presence or absence of an inert diluent, if desired. Typical inert diluents comprise the aliphatic alcohols (e. g. ethanol, n-propanol, isopropanol, n-butanol, etc.), diethyl ether, 1,4-dioxane, etc.

The bis-lepidine compounds represented by Formula III above can advantageously be prepared by heating together the base represented by the following formula:

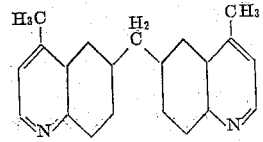

and an alkyl salt represented by the following general formula:

V      $R_1$—$X_1$

wherein $R_1$ and $X_1$ have the values set forth above.

The following example illustrates the method whereby the new bis-lepidine base represented by the above formula can be prepared. The general method used in this example has been previously described in Campbell U. S. Patent 2,451,610, dated October 19, 1948.

*Example 1.—6,6'-methylene-bis-lepidine*

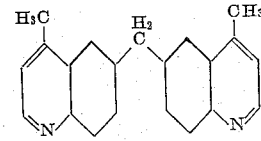

99 g. (1 mol.) of p,p'-diaminodiphenylmethane and 500 cc. of nitrobenzene were placed together in a 2 l., 3-necked flask equipped with a mechanical stirrer, thermometer, and a reflux condenser. To this was added with stirring a mixture of 30 cc. of concentrated sulfuric acid and 15 cc. of water. The mixture was heated to a temperature of 140° C. and then 153 g. (4 mols.) of methylvinylketone was added dropwise over a period of 1½ hours. Heating and stirring were then continued for a further 1½ hours. After cooling somewhat the nitrobenzene was removed by steam distillation. The mixture was then made alkaline and the liberated base taken up in ether. On concentration of the ether extracts, 12.1 g. of the bis-lepidine was obtained as a brownish solid.

The following examples will serve to illustrate more fully the manner whereby we prepare the bis-cyanine dyes of our invention.

*Example 2.—6,6'-methylene-bis (1',3-diethyloxa-4'-carbocyanine iodide)*

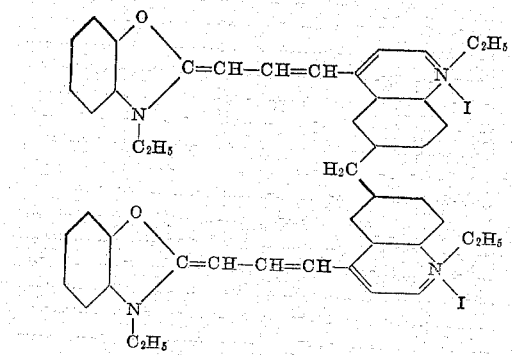

1.5 g. (1 mol.) of 6,6'-methylene-bis-lepidine and 3 g. (3 mol.) of ethyl p-toluenesulfonate were heated together on an oil bath at 110–120° C. for two hours. The viscous mass thus obtained was dissolved in 50 cc. of absolute ethyl alcohol, 4.35 g. (2 mol.) of 2-β-acetanilidovinylbenzoxazole ethiodide and 2 g. (2 mol.) of triethylamine were added, and the mixture refluxed for 15 minutes. Thus 2.15 g. of crude washed dye were obtained. After two recrystallizations from methyl alcohol it was obtained as green crystals, M. P. 225–7° C. with decomposition.

*Example 3.—6,6'-methylene-bis(1',3-diethylthia-4'-carbocyanine iodide)*

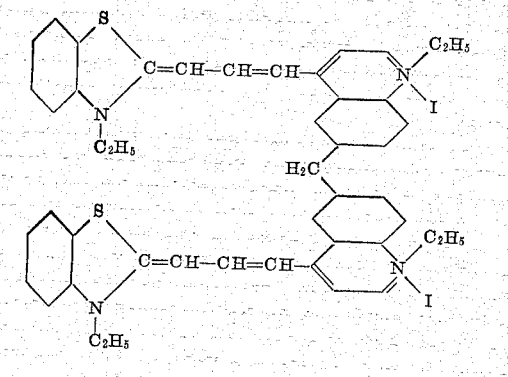

1.5 g. (1 mol.) of 6,6'-methylene-bis-lepidine and 3 g. (3 mol.) of ethyl p-toluenesulfonate were heated on an oil bath at 115–120° C. for 2 hours. The viscous mass thus formed was dissolved in 50 cc. of absolute ethyl alcohol and to this solution were added 4.5 g. (2 mol.) of 2-β-acetanilidovinylbenzothiazole ethiodide and 2 g. (2 mol.) of triethylamine, and the mixture refluxed for 15 minutes. Dye separated on cooling. The yield of crude washed dye was 3.65 g., 74%. After two recrystallizations from methyl alcohol it was obtained as dark green crystals, M. P. 235–7° C. with decomposition.

By replacing the 2-β-acetanilidovinylbenzothiazole ethiodide used in the above example by a molecularly equivalent amount of 2-β-acetanilidovinylbenzoselenazole ethiodide, 6,6'-methylene - bis(1',3 - diethylselena - 4' - carbocyanine iodide) represented by the following formula:

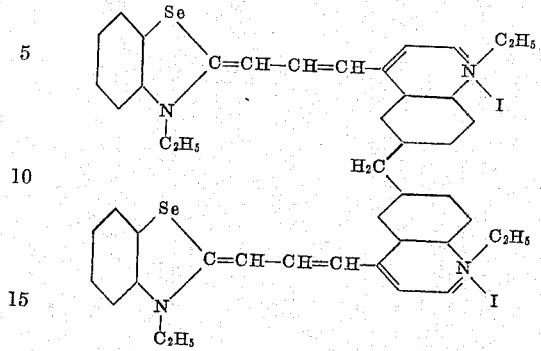

can be obtained.

In like manner, by replacing the 2-β-acetanilidovinylbenzothiazole ethiodide used in the above example by a molecularly equivalent amount of 2-β-acetanilidovinylthiazoline methiodide, 6,6' - methylene - bis(1' - ethyl - 3-methylthiazolo-4'-carbocyanine iodide) represented by the following formula:

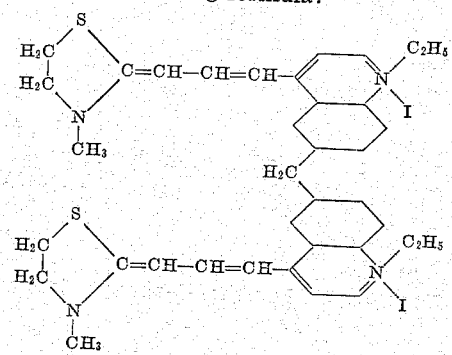

can be obtained.

*Example 4.—6,6'-methylene-bis(1,1'-diethyl-2,4'-cyanine iodide)*

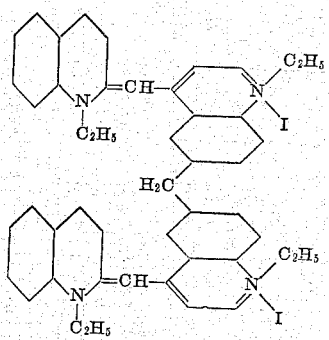

1.5 g. (1 mol.) of 6,6'-methylene-bis-lepidine and 3 g. (3 mol.) of ethyl p-toluenesulfonate were heated on an oil bath at 115–120° C. for 2 hours. The viscous mass thus formed was dissolved in 60 cc. of absolute ethyl alcohol. After adding 4.1 g. (2 mol.) of 2-iodoquinoline ethiodide and 2 g. (2 mol.) of triethylamine, the mixture was heated under reflux for 15 minutes. Dye separated on cooling. The yield of crude, washed dye was 3.45 g.; 75% of theoretical. After two recrystallizations from methyl alcohol, it was obtained as green crystals, M. P. 256–8° C. with decomposition.

By replacing the 2-iodoquinoline ethiodide used in the above example by a molecularly equivalent amount of 2-methylthio-4,5-benzobenzothiazole ethiodide, 6,6'-methylene-bis(1',3-diethyl- 4,5-benzothia-4'-cyanine iodide) represented by the following formula:

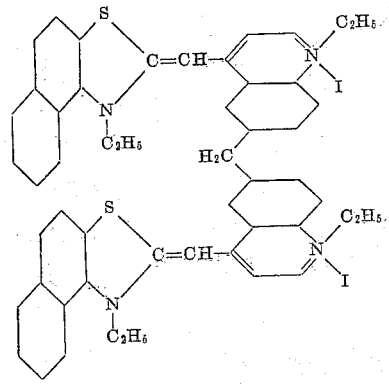

can be obtained.

In like manner other dyes coming within the scope of our invention can be prepared.

The intermediates represented by Formula IV are, in general, known compounds, their preparation being described, for example, in British Patent 344,409, accepted March 4, 1931, and White et al. U. S. Patent 2,263,749, issued November 25, 1941. For example, 2-β-acetanilidovinyl-5-phenylthiazole ethiodide can be prepared by heating together diphenylformamidine and 2-methyl-5-phenylthiazole ethiodide in the presence of acetic anhydride. The 2-methyl-5-phenylthiazole ethiodide can be obtained, of course, by the quaternization of 2-methyl-5-phenylthiazole in the usual manner. A unique method for preparing 2-methyl-5-phenylthiazole is as follows:

*Example 5.—2-methyl-5-phenylthiazole*

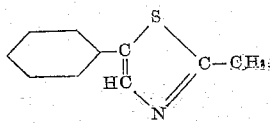

4.77 g. of 2-methyl-5-phenyloxazole and 6.66 g. of phosphorus pentasulfide were intimately mixed, and placed in a flask. The contents were then heated with a small flame until a vigorous exothermic reaction had started; at this point the flame was removed. After the reaction had subsided the product was allowed to cool and the black, hard residue was heated on the steam-bath with 400 cc. of 20% hydrochloric acid for 20 minutes. The reaction mixture was filtered and the filtrate made distinctly alkaline with 20% NaOH. The resulting suspension of 2-methyl-5-phenylthiazole was chilled at 0° C. for 10 minutes and filtered. A yield of 4.02 g. was obtained as a cream colored solid; M. P. 80–1° C. The base could be crystallized from dilute ethyl alcohol, but the M. P. was not raised.

In a like manner other oxazoles can be converted into corresponding thiazoles.

The new bis-cyanine dyes of our invention are particularly useful in altering the sensitivity of photographic emulsions in that they show a very low tendency to diffuse from emulsions in which they have been incorporated. The dyes are especially useful for extending the spectral sensitivity of the customarily employed gelatino-silver chloride, gelatino-silver chlorobromide, gelatino-silver bromide, and gelatino-silver bromiodide developing-out emulsions. The new bis-cyanine dyes of our invention can also be used to sensitize photographic silver halide emulsions which form the latent image mostly inside the silver halide grain. (See, for example, Davey and Knott application Serial No. 82,914, filed March 22, 1949; and Knott and Stevens U. S. Patents, 2,456,953 and 2,456,954, issued December 21, 1948.)

To prepare emulsions sensitized with one or more of our new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Methanol or acetone has proved satisfactory as a solvent for most of our new dyes. Where the dyes are quite insoluble in methyl alcohol, a mixture of acetone and pyridine is advantageously employed as a solvent. The dyes are advantageously incorporated in the finished washed emulsions and should be uniformly distributed throughout the emulsions.

The concentration of the dyes in the emulsions can vary widely, e. g. from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver-halide emulsion sensitized with one or more of our new dyes, the following procedure is satisfactory:

A quantity of dye is dissolved in methyl alcohol or acetone (or a mixture of acetone and pyridine) and a volume of this solution, which may be diluted with water, containing from 5 to 100 mg. of dye, is slowly added to about 1000 cc. of gelatino-silver-halide emulsion, with stirring. Stirring is continued until the dye is thoroughly dispersed in the emulsion.

With most of our dyes, from 10 to 20 mg. of dye per liter of gelatino-silver-bromide or bromiodide emulsion (containing about 40 g. of silver halide) suffices to produce the maximum sensitizing effect. With the finer grain emulsions, somewhat larger concentration of dye may be needed to produce the maximum sensitizing effect.

The above statements are only illustrative, as will be apparent that the dyes can be incorporated in photographic emulsions by any of the other methods customarily employed in the art, e. g. by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

What we claim as our invention and desire secured by Letters Patent of the United States is:

1. The bis-cyanine dyes of the following general formula:

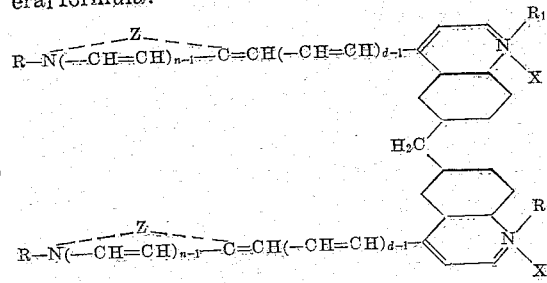

wherein R and R₁ each represents an alkyl group, X represents an acid anion, n and d each represents a positive integer from 1 to 2, and Z represents the non-metallic atoms necessary to complete a heterocyclic nucleus selected from the group consisting of those of the thiazole series, those of the benzothiazole series, those of the naphthothiazole series, those of the thinaph-theno-7',6', 4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the 1-isoquinoline series, those of the 3-isoquinoline series, those of the 3,3-dialkylindolenine series, those of the 2-pyridine series, and those of the 4-pyridine series.

2. The bis-cyanine dye represented by the following formula.

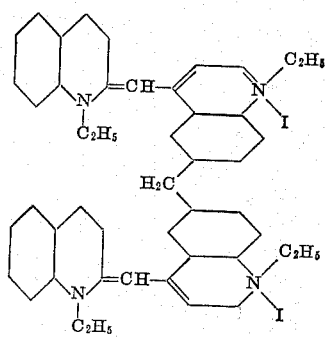

3. The bis-cyanine dye represented by the following formula:

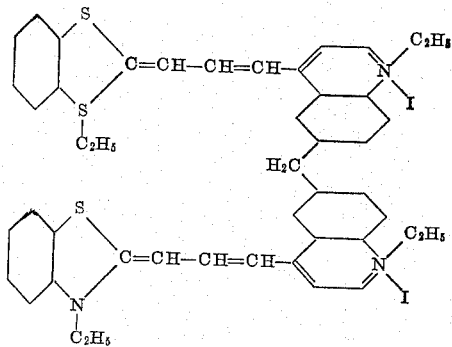

4. The bis-cyanine dye represented by the following formula:

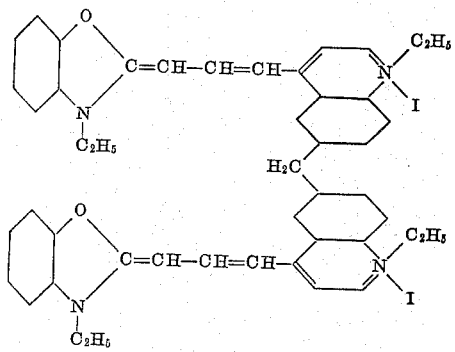

5. A process for preparing bis-cyanine dyes comprising condensing in the presence of a basic condensing agent a cyclammonium quaternary salt containing from 5 to 6 atoms in the heterocyclic ring and a group selected from those consisting of a halogen atom, a thioether group, and a β-arylaminovinyl group in a position selected from the group consisting of the α-position and the γ-position, with a bis-lepidine compound selected from those represented by the following general formula:

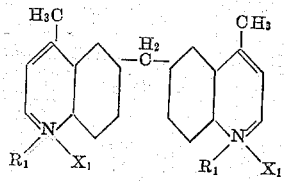

wherein R₁ represents an alkyl group and X₁ represents an acid anion.

6. A process for preparing bis-cyanine dyes comprising condensing in the presence of a basic condensing agent a benzothiazole quaternary salt containing a 2-β-arylaminovinyl group with a bis-lepidine compound selected from those represented by the following general formula:

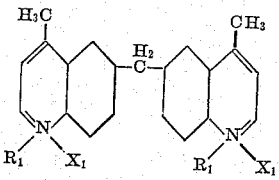

wherein R₁ represents a primary alkyl group and X₁ represents an acid anion.

7. A process for preparing bis-cyanine dyes comprising condensing in the presence of a basic condensing agent a benzoxazole quaternary salt containing a 2-β-arylaminovinyl group with a bis-lepidine compound selected from those represented by the following general formula:

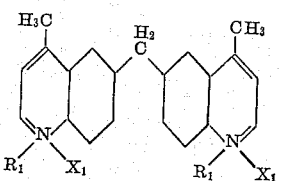

wherein R₁ represents a primary alkyl group and X₁ represents an acid anion.

8. A process for preparing bis-cyanine dyes comprising condensing in the presence of a basic condensing agent a naphthothiazole quaternary salt containing a 2-β-arylaminovinyl group with a bis-lepidine compound selected from those represented by the following general formula:

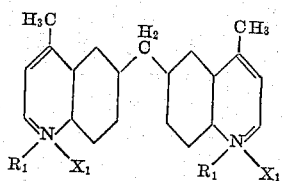

wherein R₁ represents a primary alkyl group and X₁ represents an acid anion.

9. A process for preparing bis-cyanine dyes comprising condensing in the presence of a basic condensing agent a benzoselenazole quaternary salt containing a 2-β-arylaminovinyl group with a bis-lepidine compound selected from those represented by the following general formula:

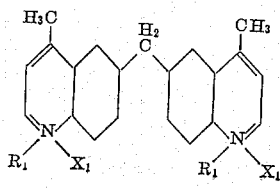

wherein $R_1$ represents a primary alkyl group and $X_1$ represents an acid anion.

10. A process for preparing bis-cyanine dyes comprising condensing in the presence of a basic condensing agent a quinoline quaternary salt containing a halogen atom in the α-position with a bis-lepidine compound selected from those represented by the following general formula:

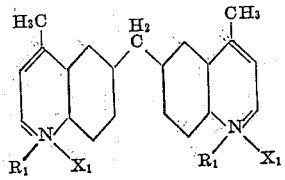

wherein $R_1$ represents a primary alkyl group and $X_1$ represents an acid radical.

GRAFTON H. KEYES.
LESLIE G. S. BROOKER.

References Cited in the file of this patent

UNITED STATES PATENTS

| Number | Name | Date |
|---|---|---|
| 256,444 | Pickhardt | Apr. 11, 1882 |
| 256,445 | Pickhardt | Apr. 11, 1882 |
| 2,388,963 | Fry | Nov. 13, 1945 |
| 2,425,772 | Wilson | Aug. 19, 1947 |